United States Patent [19]
Takano et al.

[11] Patent Number: 5,593,001
[45] Date of Patent: Jan. 14, 1997

[54] MOUNT SUPPORTING MEMBER AND MANUFACTURING METHOD THEREFOR

[75] Inventors: Masamitsu Takano, Shizuoka-ken; Takahide Maejima, Shizuoaka-ken, both of Japan

[73] Assignee: Yamakawa Industrial Co., Ltd., Fuji, Japan

[21] Appl. No.: 635,208

[22] Filed: Apr. 17, 1996

Related U.S. Application Data

[63] Continuation of Ser. No. 204,683, Mar. 1, 1994, abandoned.

[30] Foreign Application Priority Data

Jun. 11, 1993 [JP] Japan ................. 5-165094

[51] Int. Cl.$^6$ ................. B62D 21/00
[52] U.S. Cl. ................. 180/312; 52/636
[58] Field of Search ................. 180/312, 299; 296/194, 204; 52/634, 636

[56] References Cited

U.S. PATENT DOCUMENTS

| | | | |
|---|---|---|---|
| 4,822,096 | 4/1989 | Fujii | 296/194 |
| 4,899,843 | 2/1990 | Takano et al. | 180/312 |
| 4,958,844 | 9/1990 | Hancock | 296/204 |
| 5,322,317 | 6/1994 | Kusaka | 280/673 |

*Primary Examiner*—Eric D. Culbreth
*Attorney, Agent, or Firm*—Foley & Lardner

[57] ABSTRACT

An extruded good 11 is manufactured by extruding aluminum alloy or magnesium alloy and has an outline or profile forming beam 2, frame side attaching seat portions 3 respectively placed at the left and the right ends of the beam 2, a mount attaching seat portion 4 placed at a center of the beam 2, and a plurality of ribs 6 extending or bridging transversely between the front portion 2a and rear portion 2b of the beam 2. The extruded good 11 is cut by a predetermined or suitable thickness to obtain a blank 12 for the mount supporting member 1. The blank 12 is is subject to press machining in order to obtain mount supporting members of a desired or designed shape.

11 Claims, 8 Drawing Sheets

MOUNT SUPPORTING MEMBER AND MANUFACTURING METHOD THEREFOR

This application is a continuation of application Ser. No. 08/204,683, filed Mar. 1, 1994, now abandoned.

BACKGROUND OF THE INVENTION

1. Field of the Invention

The present invention relates to a mount supporting member for supporting the mount of vehicular power unit, and a manufacturing method for the supporting member.

2. Description of the Prior Art

As shown in FIG. 7 and FIGS. 8A and 8B of the accompanying drawings an engine 21 of the vehicular power unit 20 is supported on a front member 23 through left and right mounting members 22, and the transmission 24 of the power unit 20 is supported on rear member or mount supporting member 26 through mount member 25. The front member 23 and mount supporting member 26 are attached to left and right side places 27a and 27b of a frame 27.

A conventional mount supporting members 26 are mainly molded products which are manufactured by pressing a metal plate shown in FIG. 9 and FIG. 10, or aluminum die casting products shown in FIG. 11 and FIG. 12.

In case that the metal plate is pressed to produce the molded product, it is necessary to reinforce the product by using reinforcement member 28 making its weight large and sound vibration performance poor. When the product is manufactured by aluminum die casting process, it is necessary to provide a draft angle on a rib 29 in order to make drafting operation of the aluminum product from the die easy. Consequently, the thickness of the rib 29 is made thinner and thinner toward its free end producing a problem in structural strength. Also, another problem such as shrinkage cavities occurs. Also, because the temperature of the power unit 20 becomes high, it is necessary to cool it by air blowing and heat radiating. However, the pressed molded products of conventional metal plate or aluminum die casting products have a plate-like face 30, so that it is difficult to sufficiently thermally radiate and cool the products.

SUMMARY OF THE INVENTION

The mount supporting member of the present invention consists of a beam forming the outside shape, frame side attaching seat portions respectively placed at the left and the right ends of the beam, a mount attaching seat portion placed at the mid-section of the beam and having a plurality of through-holes formed by a plurality of ribs bridging transversely between a front position and a rear position of the beam portion. Preferably, the number of the through holes is at least two and their shape is generally a triangle. An opening direction of the through-holes is the same as the passing direction of heat radiation. The mount supporting members are made by extruding metal, and then cutting the extruded metal by a predetermined thickness.

According to the manufacturing method of the mount supporting member of the present invention, an extruded goods for the mount supporting member is made of metal and has a sectional shape which is the same as the die's shape, an outline shape forming beam, frame side attaching seat portions respectively placed at the left and the right end portions of the beam, a mount attaching seat portion placed at a center of the beam, and a plurality of ribs bridging transversely between the front and the rear ends of the beam.

The extruded good is cut at a predetermined length to obtain blanks of the mount supporting member and then the blanks are worked by a press in order to shape them to a predetermined one. The metal may be aluminum alloy or magnesium alloy.

Accordingly, it is the first purpose of the present invention to provide a mount supporting member of right weight which is structurally strong whose thickness can be shared according to necessity. Also, the products have little dispersion in size and are uniform in shape and size.

It is the second purpose of the present invention to provide a mount supporting member making heat radiation of the power unit easy to improve the cooling effect of the power unit.

In addition, the third purpose of the present invention to provide a manufacturing method with which the mount supporting member can be produced without difficulty.

Characteristics of the present invention will be more apparent from the following description described with reference to the accompanying drawings.

BRIEF DESCRIPTION OF THE DRAWINGS

FIG. 8A is an enlarged view of the section indicated by a circle in FIG. 8B.

DESCRIPTION OF THE PREFERRED EMBODIMENT

Figure 1:
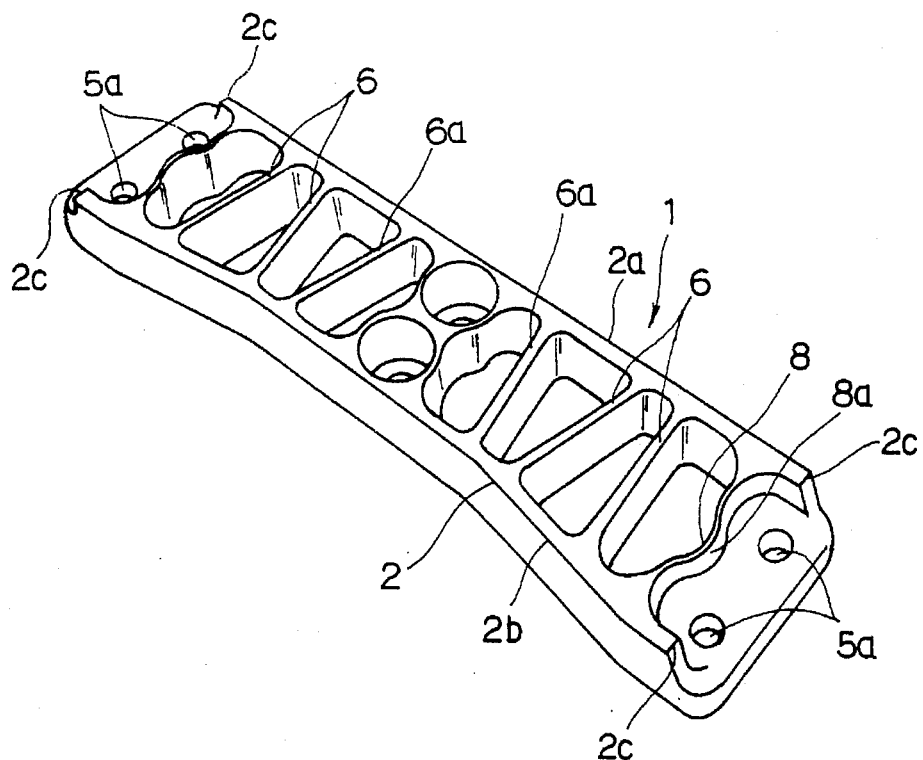
FIG. 1 is a perspective view showing a rear side of the mount supporting member according to the present invention.
Figure 2:
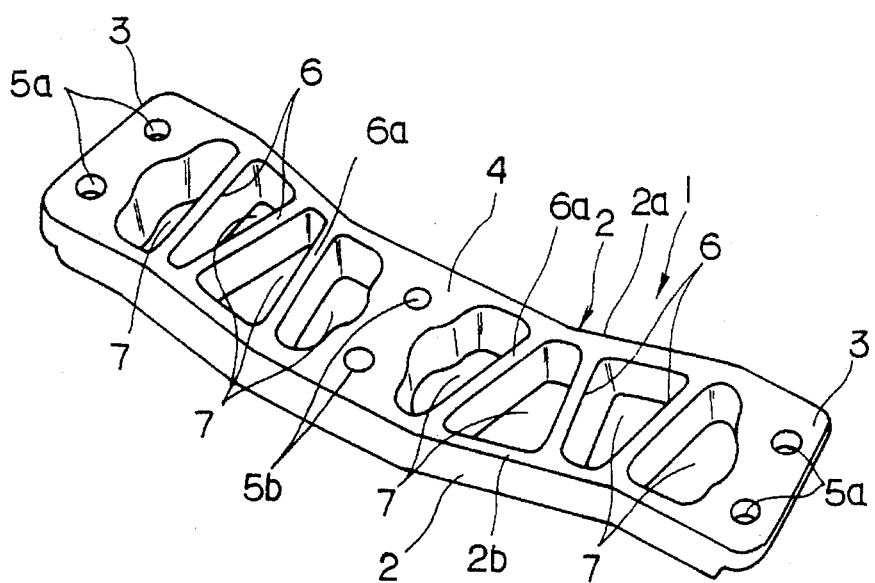
FIG. 2 is a perspective view depicting a front side of the mount supporting member.
Figure 3:
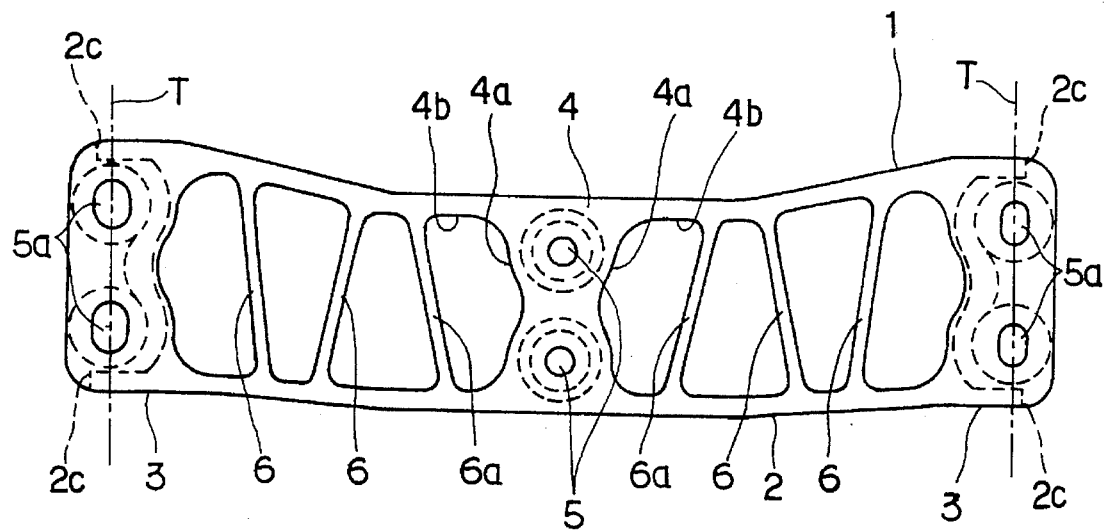
FIG. 3 is a flat view of the mount supporting member.
Figure 4:
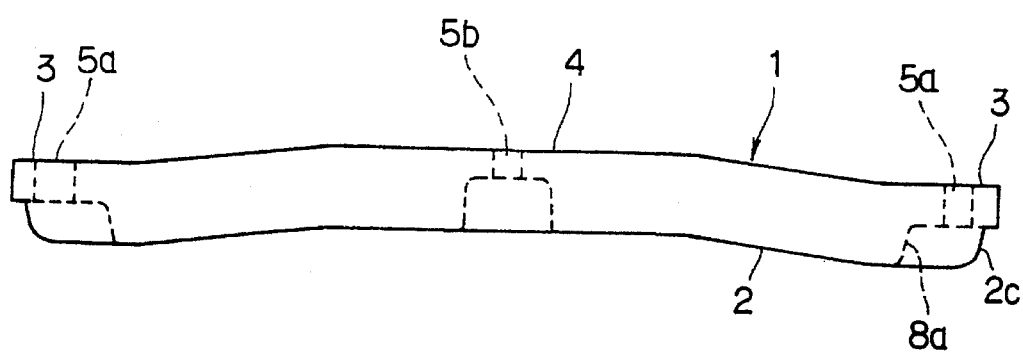
FIG. 4 is a front view of the mount supporting member.

The mount supporting member 1 according to the present invention has beam 2 for shaping outlines of the mount supporting member 1. The beam 2 has frame side attaching seat portions 3 placed at the left and the right ends of the beam and a mount attaching seat portion 4 placed at its center. The frame side attaching seat portion 3 has attaching holes 5a, mount attaching seat portion 4 has attaching holes 5b, each hole being post-processed by process machining.

The mount supporting member 1 has a plurality of ribs 6 and 6a placed along its left-and-right direction and these ribs bridge between the front and the rear portions 2a and 2b of the beam 2 so as to form a plurality of triangle through-holes 7.

In other words, the front and the rear portions 2a and 2b of the beam 2 are each a type of rib. The frame side attaching seat portion 3 is flat and is made by a pressing process and the seat portion 3 has a lower inner portion connected to the rib 8. A front end side of the outer face 8a of the rib 8 is made thin and slanted in order to improve its formability in forging work. The rib 8 is connected to the front and the rear portions 2a and 2b of the beam 2. The left and the right end portions 2c of the front and the rear portions 2a and 2b are placed offset or out of a center line T of attaching holes 5a and 5a of the frame side attaching seat portion 3, thus improving bending rigidity of the frame side attaching seat portion 3.

Curvature of a curved portion 4b formed from a side face 4a, near a center of rib 6a surrounding the through-holes 7 formed at the left and the right portions of the mount attaching seat portion 4, to the beam 2 is larger than other ones in order to prevent stress from concentrating there. Other ribs 6 surrounding the through-holes 7 are slanted so that the neighbor through-holes 7 generally have the shape of a triangle. The ribs 6 and 6a, and the beam portion 2 respectively have a section of rectangular and a fixed thickness.

A part of an upper portion of the mount supporting member 1, from the center of the member 1 to the first left and the right ribs 6 sandwiching the mount attaching seat portion 4, is made flat. Other parts of the member 1, from the first ribs 6 to the frame side attaching seat portions 3 at the left and the right ends of the beam portion 2, are slanted. The frame side attaching seat portion 3 is parallel with the mount attaching seat portion 4.

Figures 5A, 5B, 5C:
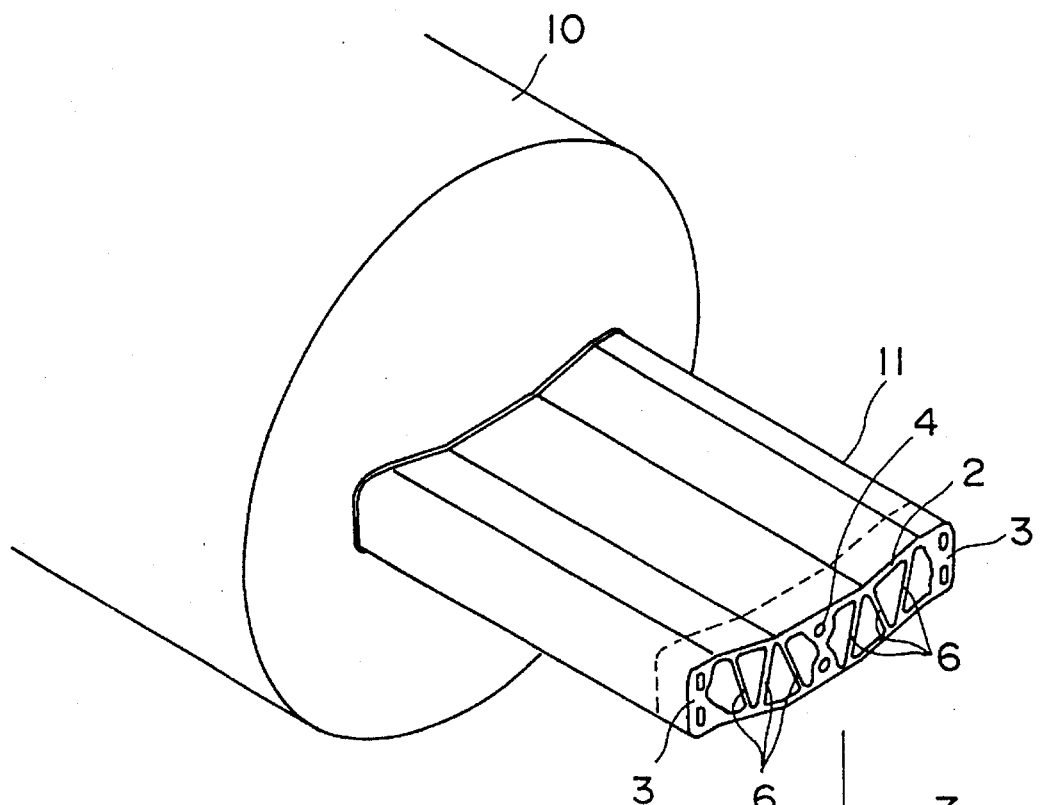
FIGS. 5A to 5C are illustrative views of a manufacturing method for the mount supporting members.

The mount supporting member 1 having the structure above is made of aluminum alloy or magnesium alloy. The member 1 is made by an aluminum extruding molder 10 and then by a press machine. That is, as shown in FIGS. 5A to 5C, aluminum alloy is extruded from an aluminum extruder 10 and an extruded good 11 is produced. A sectional shape of the extruded good 11 is the same as that of a die of the aluminum extruder 11.

In the next cutting step, the extruded good 11 is cut at a predetermined thickness and blanks 12 for the mount supporting member 1 and then the blanks 12 are worked by a press machine. Consequently, top face of the mount supporting member 1 is made flat in areas from its center to the first left and the right ribs 6a sandwiching the mount attaching seat portion 4. The areas of the left and the right end portions of the beam portion 2 are made slanted toward the frame side attaching seat portion 3. By the press machining, the ribs 6 are made curved or slanted in order to make radiation heat easy to radiate. The frame side attaching seat portions 3 are made parallel with the mount attaching seat portion 4. Next, a forging machine or machinery works the frame side attaching seat portions 3 and the mount attaching seat portion 4, and makes attaching holes 5a and 5b obtaining the mount supporting member 1 of the present invention.

Figure 6A:
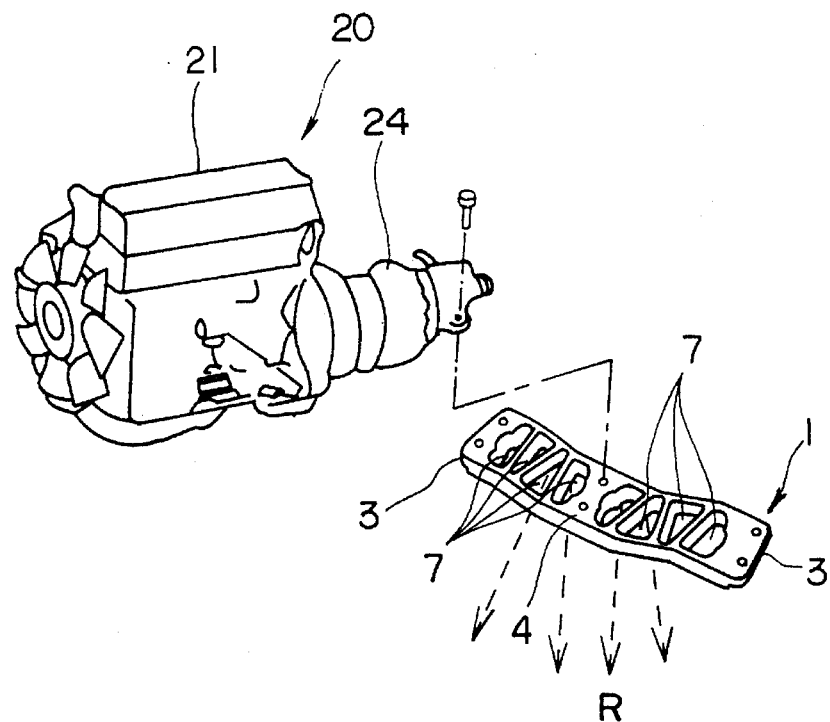
FIG. 6A is a perspective view of the power unit and the mount supporting member according to the present invention in a disassembled condition.
Figure 6B:
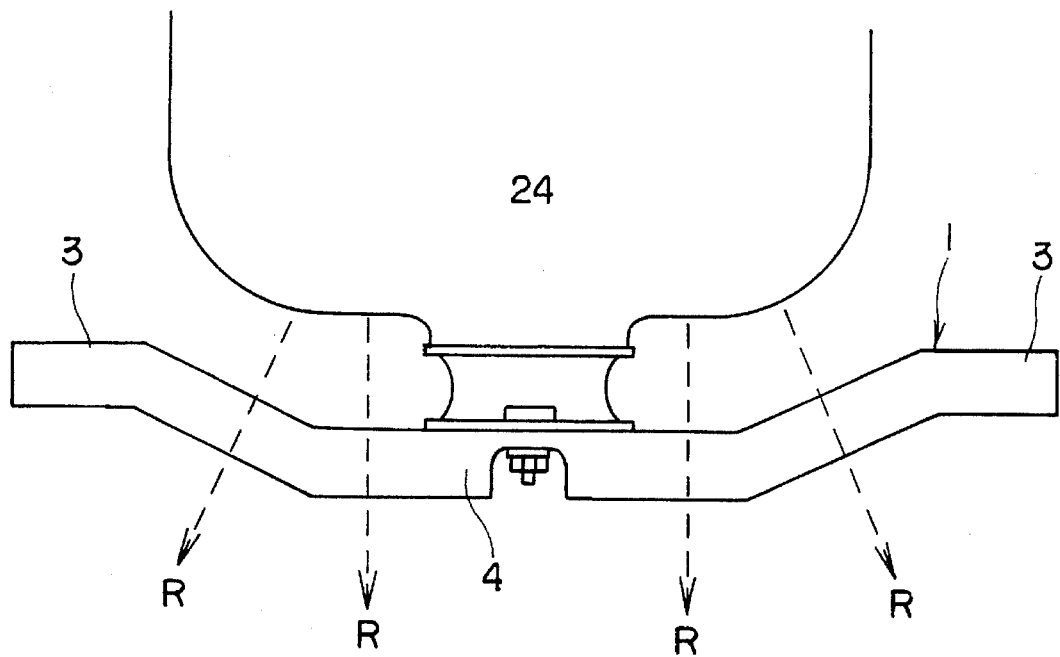
FIG. 6B is an illustrative view of the assembled power unit and mount supporting member.
Figure 7:
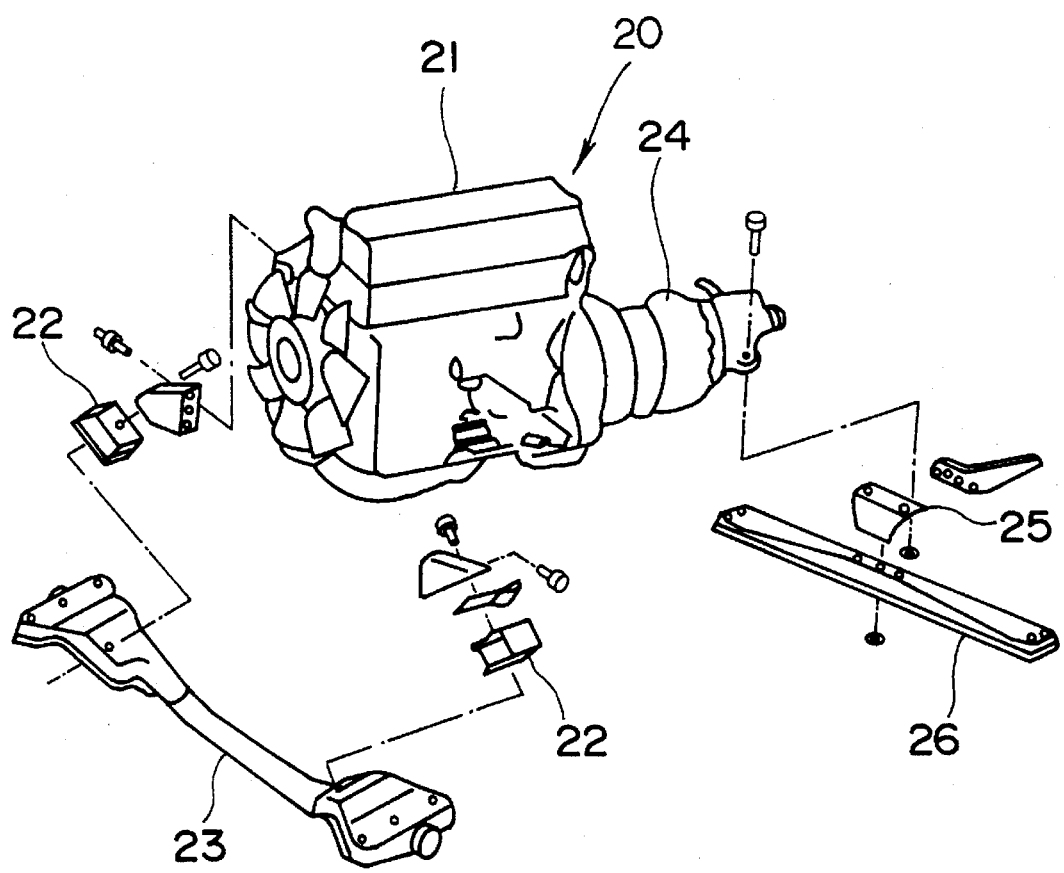
FIG. 7 is a perspective view of a disassembled part of a power unit, a mount structure, and a mount supporting member of the present invention.
Figure 8A:
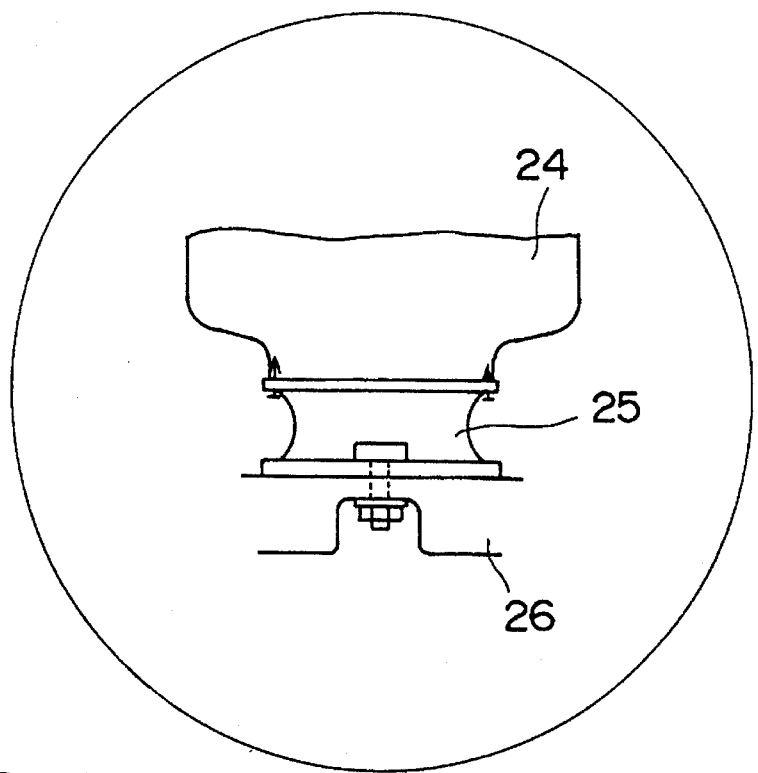
FIGS. 8A and 8B are illustrative views of a power unit, a mount structure, and a mount supporting member in an assembled condition.
Figure 8B:
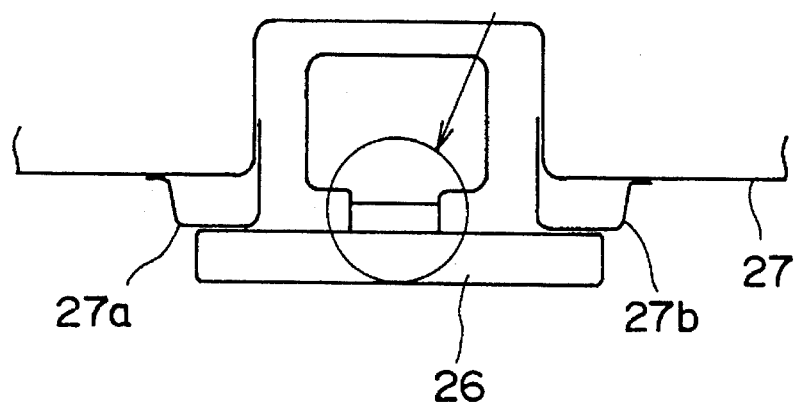
Figure 9:
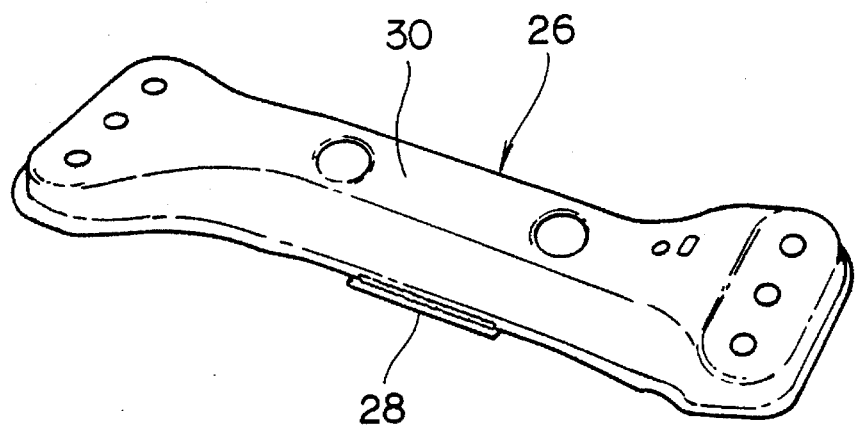
FIG. 9 is a perspective view of a front side of the conventional mount supporting member.
Figure 10:
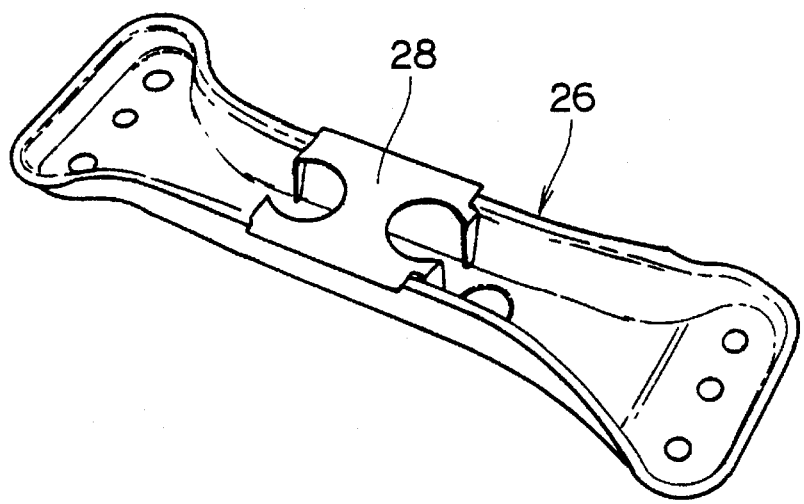
FIG. 10 is a perspective view of a rear side of the conventional mount supporting member.
Figure 11:
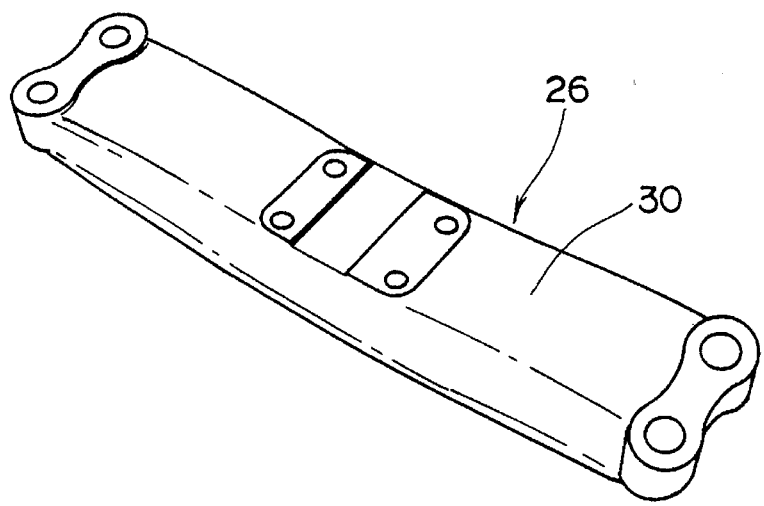
FIG. 11 is a perspective view of a front side of another conventional mount supporting member.
Figure 12:
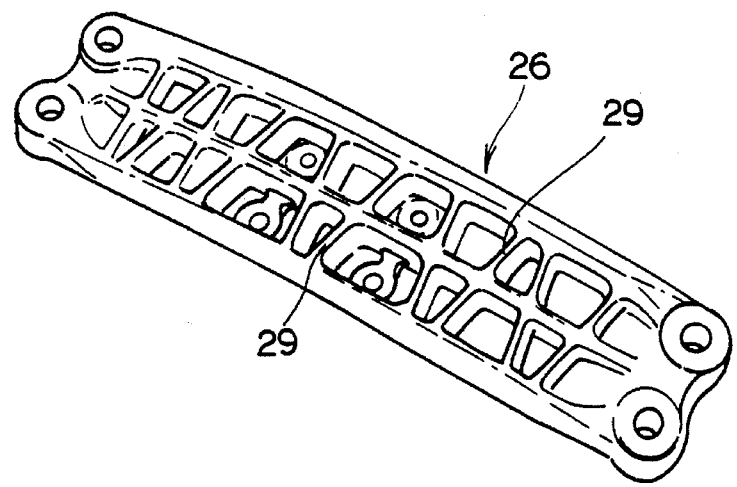
FIG. 12 is a perspective view of a rear side of the mount supporting member shown in FIG. 11.

As shown in FIG. 6A and FIG. 6B the mount supporting member 1 manufactured as described above supports the transmission 24 placed at rear of the engine 21 of the vehicular power unit 20. As described above, the mount supporting member 1 has a plurality of through holes 7 directed along passing or flowing direction of radiation heat R from the power unit 20. As a result, it is easy to radiate or disperse radiation heat of the power unit 20 and cooling effect of power unit 20 is improved.

As described in detail above, the mount supporting member according to the present invention consists of beam portion shaping outline or periphery of the member, frame side attaching seat portions respectively placed at the left and the right ends of the beam, a mount attaching seat portion placed at a mid-section of the beam, and a plurality of through-holes formed by a plurality of ribs bridging transversely between the front portion and the rear portion of the beam. It is noted that the mount supporting member is first extruded in a shape extending in a direction of the through holes, and then it is cut by a predetermined length.

Compared to the conventional shaped goods made by a press machining metal plates, the mount supporting member of the present invention does not require any reinforcement member necessitated by the light weight of the mount supporting member and the thickness of the member can be selected according to the particular needs. Consequently, different from the conventional press machining process, it is not necessary to prepare a plurality of molds and little distribution or difference in size is given to the products since the blank of the desired supporting member can be precisely cut.

In addition, the mount supporting member of the present invention has a plurality of through-holes formed by the front portion and the rear portion of the beam and a plurality of ribs, and these through-holes have triangle shapes resulting in a strongest rigidity of the supporting member. Draft angle need not be provided on side walls or faces of the beam and its portions and ribs, so that it is possible to make the thickness of the beam and its portions and ribs uniform in uniform thickness of the mount supporting member resulting in large bending strength of the member.

According to the mount supporting member described in claim 1, the through-holes are formed in a passing or dispersing direction of radiation heat, so that radiation heat from the power unit becomes easy to radiate thereby improving cooling effect for the power unit.

According to the manufacturing method for the mount supporting member of the present invention, metal is extruded to obtain an extruded goods having an outlined beam, frame side attaching seat portions placed at the left end and the right end of the beam, a mount attaching seat portion placed at a center of the beam, and a plurality of ribs bridging transversely between the front portion and the rear portion of the beam. Then the extruded goods is cut by a predetermined thickness obtaining blanks for the mount supporting members. The blanks are subjected to press working to obtain a product of designed shape. It is apparent that the mount supporting member of the present invention can be easily manufactured of aluminum alloy or magnesium alloy.

We claim:

1. A mount supporting member for a mount of a vehicular power unit, said member being formed by cutting an extruded good by a predetermined thickness, said member comprising:

a beam defining outer contours of the mount supporting member;

frame side attaching seat portions which, placed at the left and the right ends of the beam, have respectively a bolt attaching hole with a central axis aligned in a direction substantially parallel to a predetermined direction;

a mount attaching seat portion placed at a center of the beam, said mount attaching seat portion including a bolt attaching hole with a central axis aligned in the direction substantially parallel to the predetermined direction; and a plurality of ribs respectively extending transversely between a front portion and a rear portion of the beam so as to form through-holes with axes which are generally parallel to the predetermined direction, wherein the front and rear portions of the beam on either side of the mount attaching seat portion are inclined with respect to a plane orthogonal to the predetermined direction, such that heat is radiated from the vehicular power unit in a direction which is substantially aligned with the axes of the through-holes.

2. The mount supporting member according to claim 1, wherein a number of said through-holes is at least two and shapes of said through-holes is generally triangular.

3. The mount supporting member according to claim 1, wherein said through-holes are open and adapted to radiate heat from said vehicular power unit through said through-holes.

4. The mount supporting member according to claim 1, wherein the frame side attaching seat portions include a flat portion having a bolt attaching hole.

5. The mount supporting member according to claim 4, wherein the flat portion of the frame side attaching seat portions is formed by press machining in a direction of beam thickness.

6. The mount supporting member according to claim 5, wherein a number of said through-holes is at least two and shapes of said through-holes is generally triangular.

7. The mount supporting member according to claim 6, wherein said through-holes are open and adapted to radiate heat from said vehicular power unit through said through-holes.

8. The mount supporting member according to claim 5, wherein said through-holes are open and adapted to radiate heat from said vehicular power unit through said through-holes.

9. The mount supporting member according to claim 4, wherein a number of said through-holes is at least two and shapes of said through-holes is generally triangular.

10. The mount supporting member according to claim 9, wherein said through-holes are open and adapted to radiate heat from said vehicular power unit through said through-holes.

11. The mount supporting member according to claim 4, wherein said through-holes are open and adapted to radiate heat from said vehicular power unit through said through-holes.

* * * * *